June 5, 1928.

E. G. OAKLEY 1,672,082

METHOD OF MAKING TIRE VALVE CAPS AND THE LIKE

Filed March 28, 1923    3 Sheets-Sheet 1

Inventor
Erastus G. Oakley
By Henry E. Rockwell
Attorney

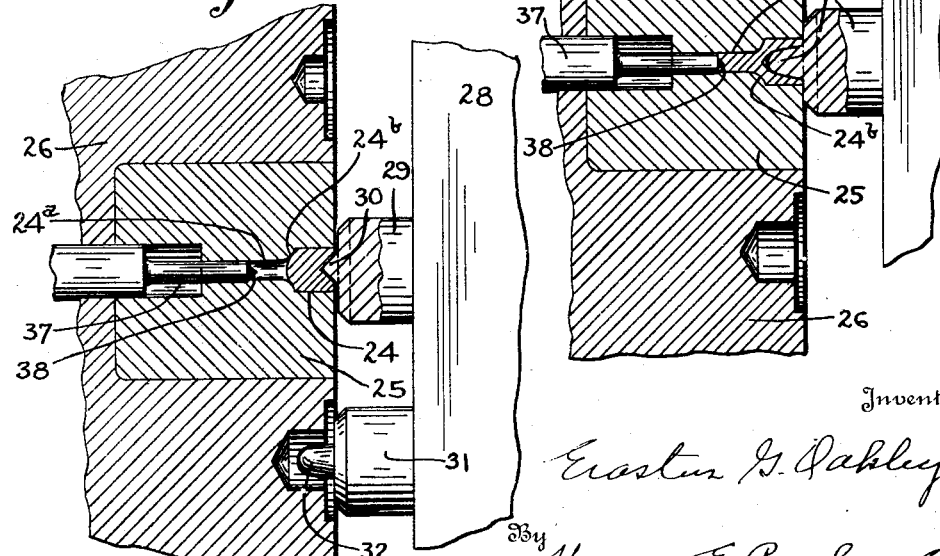

June 5, 1928.
E. G. OAKLEY
1,672,082
METHOD OF MAKING TIRE VALVE CAPS AND THE LIKE
Filed March 28, 1923     3 Sheets-Sheet 3
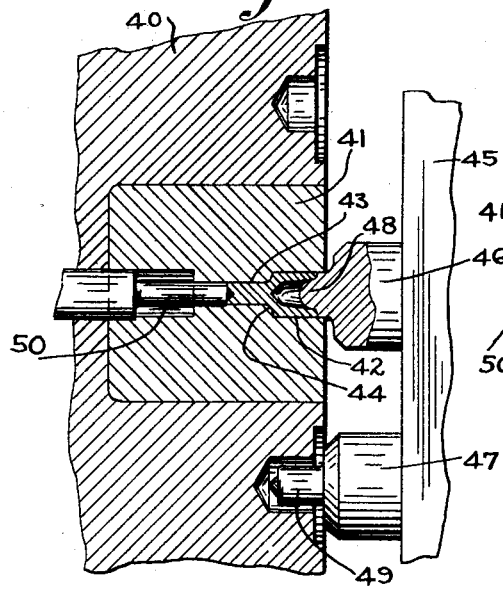
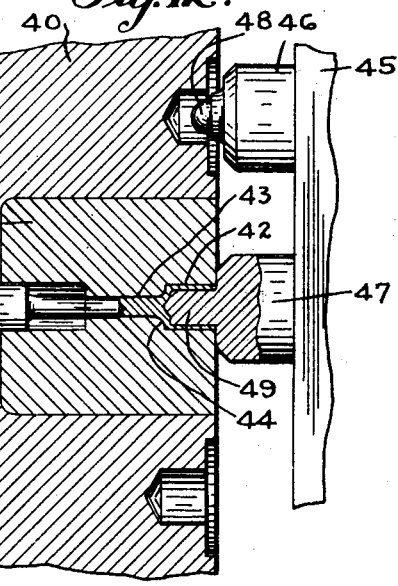
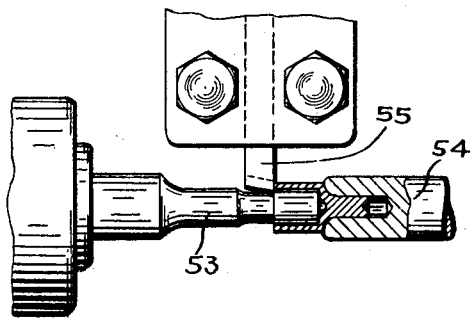
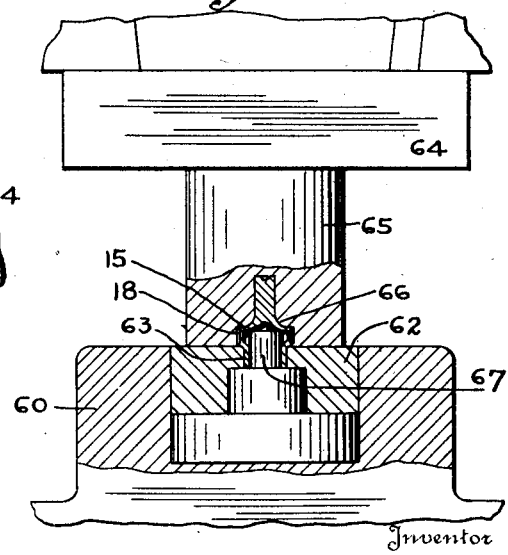
Inventor
Erastus G. Oakley
By Henry E. Rockwell
Attorney Patented June 5, 1928.

1,672,082

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT, A CORPORATION.

METHOD OF MAKING TIRE-VALVE CAPS AND THE LIKE.

Application filed March 28, 1923. Serial No. 628,288.

This invention relates to tire valve caps and more particularly to a new and improved method of making caps, adapted to be applied to the upper or open end of a so-called valve stem or casing, attached to the inner tube of a pneumatic tire. Such caps prevent the ingress of dirt or foreign substances to the valve mechanism within the stem, and also serve to prevent the escape of air from the tire which may happen to leak through the valve.

In the past, these caps have ordinarily been made from bar stock by screw machine operations, or, in some instances, have been formed of sheet metal. The first of these methods is more or less expensive and entails a considerable waste of metal, while a cap made of sheet metal is usually hollow and, therefore, must be provided with an inner disk or seal of some character to close the upper end thereof. The last method is, therefore, objectionable also from the standpoint of economy and, moreover, does not result in a satisfactory article.

I propose, by my present invention, to make a tire valve cap of wire or bar stock in such a manner that the manufacturing operations involved may be comparatively few in number and cheaply performed, and, in addition, there will be practically no waste of material. Moreover, the cap produced by my method will be strong and durable and will have a closed or solid upper end or extension which may, if desired, be provided with a washer to seal effectually the valve casing.

One object of my invention, therefore, is to provide an improved method for manufacturing valve caps which will be more economical than the methods employed at the present time, and which will result in a superior article.

Another object of my invention is to provide a new and improved method of manufacturing valve caps from solid bar or wire stock, such that the amount of material wasted will be reduced to a minimum. More particularly, I propose to make a valve cap from solid wire stock, principally by a series of stamping operations which may be performed cheaply, and which, if carried out according to my invention, will result in the formation of a strong and durable valve cap of accurate dimensions.

To these and other ends, the invention consists in the novel features and combinations of steps to be hereinafter described and claimed.

In the accompanying drawings:

Fig. 8 is a top plan view of the parts shown in Fig. 7;

Fig. 9 is a fragmentary front view of the header press used for the first stamping operations, the die and die bed being shown in section, illustrating the result of the first stroke;

Fig. 10 is a view similar to Fig. 9, showing the operation of the second stroke of the header press, shown in Fig. 9;

Fig. 11 is a view similar to Fig. 9, showing the result of a succeeding operation upon the blank;

Fig. 12 is a view similar to Fig. 11, showing a further step;

Fig. 13 is a fragmentary view, partly in elevation and partly in section, showing the operation of trimming the lower edge of the blank; and Fig. 14 is a view, partly in section and partly in elevation, showing the operation of displacing the upper part of the cupped portion of the blank to form an annular recess and exterior knurlings.

Figure 1:
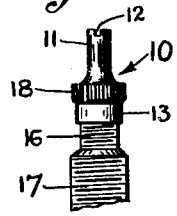
Fig. 1 is a side elevational view of a valve cap embodying my improvements, mounted upon a tire valve stem of the usual form.
Figure 2:
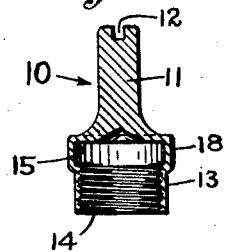
Fig. 2 is an enlarged sectional view of a valve cap.

My improved valve cap is preferably of the form shown at 10 in Figs. 1 and 2, consisting of an upper extension or neck 11, provided with a slot 12, and a lower skirt or cupped portion 13, having internal threads 14, and provided at its upper portion with a bulged or outwardly expanded wall to provide an annular recess 15. The cap is adapted to be applied in the usual manner to the upper, reduced, threaded end 16 of a valve stem 17 of any approved form.

It will be understood that while in the accompanying drawings I have illustrated a preferred embodiment of my invention and have shown a preferred method of carrying out the steps by which the valve cap is made, it will be understood that the method is not in all aspects dependent upon the precise steps illustrated or upon the particular mechanism shown for carrying out these steps.

Figure 3:
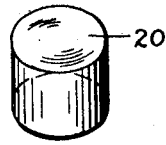
Fig. 3 is an enlarged perspective view of a blank from which the cap is made.
Figure 7:
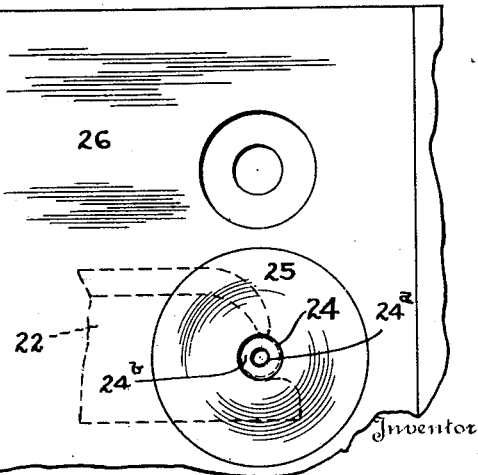
Fig. 7 is a fragmentary face view of the die bed, die, and cut-off and carrier mechanism.

Preferably the manufacture of the cap is begun by cutting off a slug or blank 20, shown in Fig. 3, from a length of wire or bar stock 21. This cutting operation may be performed, as shown in Figs. 7 and 8, by a combined cutter and carrier 22, reciprocably movable across the face of the die bed. As shown more particularly in Fig. 8, the wire or bar stock 21 is fed through an opening 23 in the die bed, the end being arranged to project for the required length from the face of the bed to be severed by the cutter 22. The cut-off slug or blank is carried to a point opposite the die opening by the reciprocable cutter and carrier, as shown by dotted lines in Fig. 7. This die opening is shown at 24 in Fig. 9, and is formed in the die 25, suitably mounted in the die bed 26.

I prefer to perform the first operations in the manufacture of the valve cap in what is known as a double-stroke header press, such as is shown in a more or less fragmentary way in Figs. 8, 9, and 10, although it will be understood that the same operations may, if desired, be performed by other means. The press shown comprises the die bed 26 and die 25, already referred to, and a ram 28, to which is secured a punch 29, provided with a centering projection 30 and a second punch 31, provided with a forming projection 32.

Figure 4:
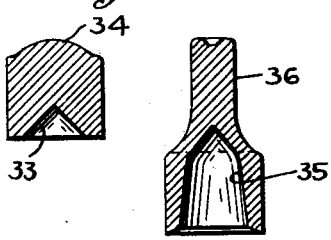
Fig. 4 shows in two sectional views the appearance of the blank after the first two stamping operations.

When the slug or blank 20 is carried to a point opposite the die opening 24 by the carrier 22, the press is operated, bringing the punch 29 against the die block 25, which operation drives the blank into the die opening 24, and displaces the metal of the blank in such a manner that a depression 33 is formed in the outer surface of the blank, the metal flowing inwardly to form a bulged portion 34 at the other end of the blank, as shown in Fig. 4. This first stroke of the header press tends to force the metal of the blank into contact with the wall of the die opening, and at the inner portion of this opening against the fillet 24$^b$ between the die opening and the neck 24$^a$. At the moment that the projection 30 on the punch 29 comes in contact with the blank, the carrier 22 retreats to its original position, shown in Fig. 7, in which position it is ready to cut off another blank and feed it to the press.

At the second stroke of the press, the punch 31 is brought down upon the blank, as shown in Fig. 10. The result of this operation is that the blank is cupped out to form a relatively deep cavity 35 by the projection 32 upon the punch, the metal which is displaced being extruded into the neck 24$^a$ of the die opening 24 to form a neck 36 upon the blank. It will be apparent from an inspection of Figs. 4 and 10 that the metal of the blank will, in this operation, be conformed to the configuration of the die opening and neck, the neck which is formed on the blank being driven against the knock-out punch 37. This punch may be provided with a small projection 38 on its end to force the metal outwardly at this point against the wall of the neck of the die opening.

Figure 5:
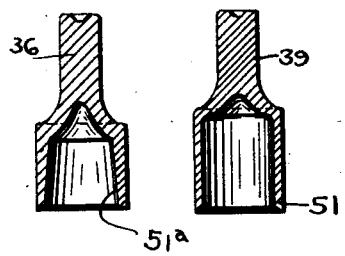
Fig. 5 shows in two sectional views the appearance of the blank after the third and fourth stamping operations.
Figure 6:
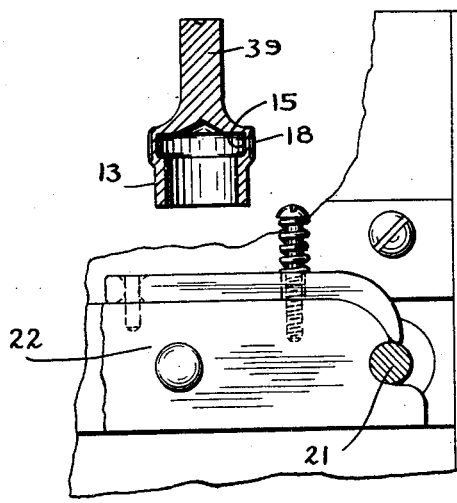
Fig. 6 shows in section the appearance of the formed cap after the last stamping operation.

The blank which has now been given the shape shown in cross-section in Fig. 4 is then subjected to succeeding stamping or swaging operations to give it the form shown at 39 in Fig. 5. For these operations, I also prefer to use a double-stroke header press, the operations of which are illustrated in Figs. 11 and 12, although the mechanism for performing these steps of my improved method may be varied without departing from the spirit of the invention. The blank, as shown at the right in Fig. 4, may be fed into a suitable press of the preferred type in any desired way. The press, as shown, consists of a die bed 40, having a die 41, provided with an opening 42, having a neck 43, which joins the main portion of the opening 42 by a fillet 44. It will be noted that this fillet 44 is of considerably sharper curvature than the fillet 24$^b$ in the die 25. Cooperating with the die 41 is a ram 45 carrying the punches 46 and 47, provided respectively with the tool projections 48 and 49. After the blank is fed into the opening 42, the punch 46 is first brought down upon it and serves to drive the blank forcibly into the die opening, the neck 36 being lodged against the knock-out punch 50, and the metal of the blank being swaged or caused to flow, to some extent, to conform to the fillet 44. The mouth of the depression or cup 35 is slightly enlarged, as shown at 51$^a$ in Fig. 5, to provide for the entry therein of the projection 49 of the punch 47. It will be noted that the skirt or cupped portion of the blank does not completely fill the opening 42, the length of this portion of the blank being less, at this stage in the manufacture of the cap, than the depth of the die opening.

The punch 47 is then brought up against the work, by a further heavy stroke, the action of this punch being to cause the wall of the cupped or skirt portion of the blank to flow outwardly to completely fill the die opening about the projection 49 on the punch. This produces a thinning of the metal in this part of the blank, and a consequent lengthening of the skirt or cupped wall, as shown at 51.

Any unevenness or bevel which may exist at the lower edge of the cupped portion of the blank may now be trimmed off by a suitable milling operation. This may be performed by the mechanism shown in a more or less fragmentary way in Fig. 13, wherein the blank is held upon a suitable arbor 53 by the runner bar 54, and revolved while in contact with the cutting edge of a suitable milling tool 55.

It is desirable that the finished cap be provided with an exterior knurled portion by which it may be grasped, and as the cap must be internally threaded to be secured upon the tire valve, it is also desirable that an annular recess be provided at the upper part of the skirt or cupped portion, in order to relieve the threading die. This interior annular recess and exterior knurled projection may be conveniently formed in one operation by means of the header press shown in Fig. 14. As illustrated in the drawings, I prefer to use for this purpose a press, comprising a die bed 60, having a suitable die 62, provided with an opening 63 in which the blank may be seated. Cooperating with the die bed is a ram 64 and punch 65 provided with a forming opening 66 of the proper shape. As shown in Fig. 14, when the punch is brought down upon the blank seated in the die opening 63, the part of the cupped portion of the blank above the die will be bulged out to form an exterior annular projection or bead 18 upon the cup and a corresponding interior recess 15, and, at the same time, suitable knurlings will be impressed upon the periphery of the bead. During this operation, it may be desirable to locate within the cupped portion of the blank a suitable post 67 which will prevent any distortion of this part of the blank, during this operation, by an inward displacement of the metal.

The cap is now in its finished form, and the notch 12 may be cut in the upper surface of the neck by any approved method, and, likewise, the internal threads 14 may be cut with a suitable tap to provide a means for attaching it to the valve stem.

It will be apparent that I have provided a method of manufacturing valve caps and similar articles which consists of relatively few operations, which may be economically performed, and in the employment of which there is practically no waste of metal, due, in a large measure, to the fact that the regular shape of the blank or slug is changed into an article of irregular shape or contour by causing a displacement or flowing of the metal, rather than by milling operations, which would entail a serious wastage.

While I have shown and described a preferred form of my invention, it will be obvious that it is not limited to all of the details shown or to the exact order in which the steps are performed, as herein described, but the method is capable of modification and variation within the spirit of the invention and within the scope of the appended claims.

In so far as I am aware, I am the first to provide a valve stem cap or similar article, having a solid neck or tip pushed out from the upper end of the body. Such a cap is easily distinguishable from those made by screw machine methods, in that the grain of the metal instead of being parallel to the axis of the body, as in screw machine products, is deflected radially and inwardly in the top portion or dome of the cap proper, in that zone where the neck merges with the cap body. In other words, the grain of the metal runs parallel with the wall where the wall is turned inwardly and upwardly, as well as elsewhere, and in the connecting portion or zone of junction where the neck and body merge, the wall is curved on a gradual fillet by the process herein described, where the slug used as a blank is confined peripherally, while in the meantime, the interior portion of the blank is pushed out of the body and into a die, having its mouth curved on a gradual fillet.

It will be obvious that the invention is not limited to use in tire valve caps and that the method may be employed in the production of other articles.

Where I refer to the step of pushing out the interior portion of the blank to form a solid neck, I do not necessarily restrict myself to a method in which the peripheral part of the blank is held stationary while the interior part is moved in an axial direction, as an obvious reversal, wherein the interior part of the blank is held stationary while the outer part is displaced to form a cup or skirted portion, might be adopted under certain conditions. In the broadest aspect of the invention, the important feature is believed to consist in the displacement of the interior and exterior portions of the slug relatively to each other to form a solid neck integral with a cup shaped portion.

What I claim is:

1. The method of making a tire valve cap or similar article, which comprises pushing out the metal from the interior of a blank of solid stock to form a cup shaped body and a terminal neck, drawing the metal of the body to lengthen and thin the wall of the cup shaped portion, displacing outwardly a portion of the wall of the cup to form an external bead by the application of pressure at both ends of the body, and then providing threads internally upon the cup shaped portion.

2. The method of making a tire valve cap or similar article from a blank of solid bar stock, which comprises extruding the metal endwise from the interior of the blank to form a terminal neck thereon and to leave a cavity in the body portion of the blank, and then further drawing the body portion of the blank to form a cup-shaped body.

3. The method of making a tire or valve cap or similar article from a blank of solid bar stock, which comprises extruding the metal endwise from the interior of the blank to form a terminal neck thereon, and to leave a cavity in the body portion of the blank, and bulging out the wall of the hollow portion of the blank to form an external bead thereon.

4. The method of making a tire valve cap or similar article, which comprises preparing from a blank a cap body having a hollow body portion and a solid terminal neck, and applying pressure at the opposite ends of said hollow body portion to bulge out a portion of the wall so as to form an internal annular recess and an external enlargement on the body.

5. The method of making a tire valve cap or similar article, which comprises extruding the metal endwise from the interior of a blank of solid stock to form a cup-shaped body and a terminal neck, drawing the metal of the body to lengthen the wall of the cup-shaped portion, and displacing outwardly a portion of the wall of the cup to form an external bead.

6. The method of making a tire valve cap or similar article, which comprises extruding the metal endwise from the interior of a blank of solid stock to form a cup-shaped body and a terminal neck, drawing the metal of the body to lengthen the wall of the cup-shaped portion, displacing outwardly a portion of the wall of the cup to form an external bead, and then providing internal threads upon the cup-shaped portion.

7. The method of making a tire valve cap, or a similar article, which comprises peripherally confining a thick metal slug and simultaneously pushing out endwise the interior part of the slug into a die opening having a gradual fillet, so that the resulting article presents a neck gradually merging with a skirted body.

8. The method of making a tire valve cap, or a similar article, which comprises displacing relatively to each other in a longitudinal direction the interior and exterior portions of a thick metal slug to form a solid neck merging into a skirted portion.

In witness whereof, I have hereunto set my hand on the 26th day of March, 1923.

ERASTUS G. OAKLEY.